Figure 1:
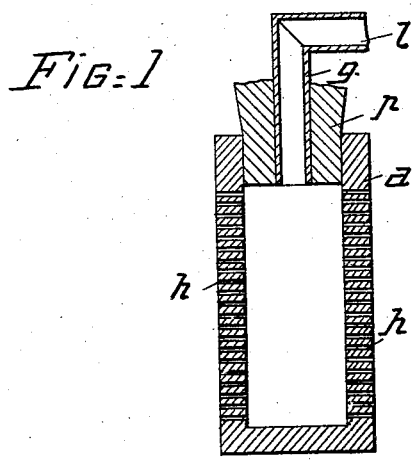

E. W. JUNGNER.
CARBON CONSUMING GALVANIC CELL.
APPLICATION FILED JUNE 27, 1906.

919,022.

Patented Apr. 20, 1909.
2 SHEETS—SHEET 1.

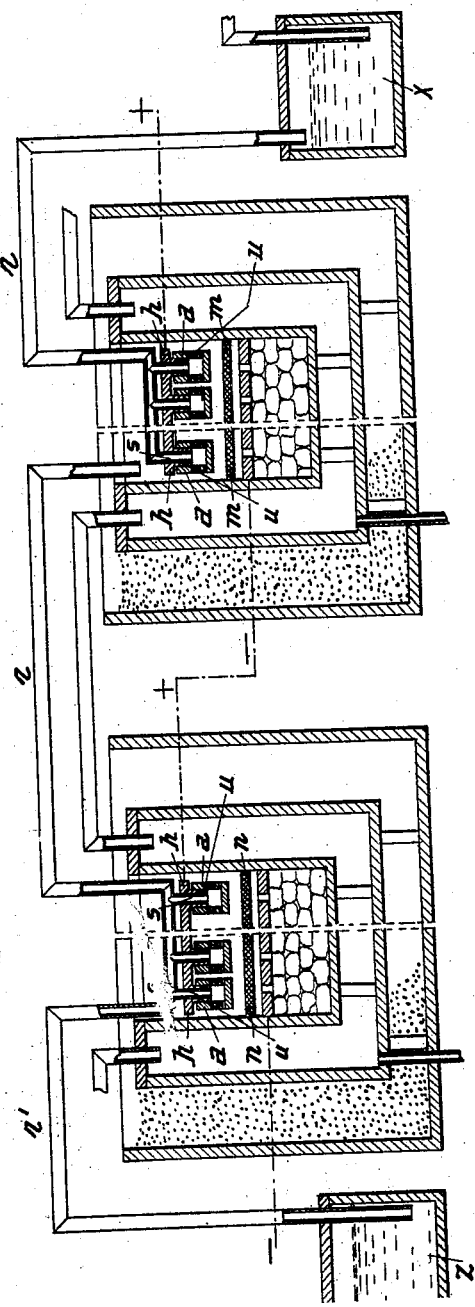

UNITED STATES PATENT OFFICE.

ERNST WALDEMAR JUNGNER, OF KNEIPPBADEN, NORRKÖPING, SWEDEN.

CARBON-CONSUMING GALVANIC CELL.

No. 919,022.     Specification of Letters Patent.     Patented April 20, 1909.

Application filed June 27, 1906. Serial No. 323,678.

*To all whom it may concern:*

Be it known that I, ERNST WALDEMAR JUNGNER, a subject of the King of Sweden, residing at Kneippbaden, Norrköping, Sweden, have invented certain new and useful Improvements in Carbon - Consuming Galvanic Cells; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

It has heretofore been proposed to "burn" carbon in the cold in galvanic batteries by connecting the same in a suitable electrolyte with substances having the property of giving up oxygen with great facility, such as peroxid of lead, exothermic combinations of chlorin and oxygen, or the like. As a suitable electrolyte dilute sulfuric acid has been used. As is well known, as the carbon becomes oxidized by these highly depolarizing substances, it is possible to obtain with such a cell a certain slight combustion or oxidation of the carbon anodes. By substituting for said highly depolarizing substances the oxygen of the air, the depolarizing power of which is quite low, no oxidation or combustion worth mentioning is obtained, owing to the fact that the electro-activity of the carbon in dilute sulfuric acid, at ordinary temperature, is very inconsiderable.

I have discovered that the electro-activity of amorphous carbon in sulfuric acid will be considerably increased the more the acid is concentrated. By using an acid containing 50% $H_2SO_4$, pronounced electro-activity occurs, and by using an acid containing 90% sulfuric mono-hydrate, it is possible to obtain from a determined quantity of carbon connected with a constant depolarizer, a quantity of energy per unit of time about ten times greater than the energy obtained from the same quantity of carbon in an acid of the concentration ordinarily used for electro-chemical purposes. Consequently a considerable galvanic oxidation of the carbon by means of the oxygen of the air is obtained.

Concentrated sulfuric acid, however, as is well known, is a very bad conductor of electricity, the temperature of the acid may be raised somewhat over the ordinary temperature in order to increase its conductivity, consequently the electro-activity of the carbon also becomes further increased, principally for the reason that by the increased temperature certain reactions between the amorphous carbon and the sulfuric acid occur by which highly reducing gases are formed.

The following general reaction is supposed to take place:

1. $2C + H_2SO_4 = 2CO + H_2 + SO_2$.

If the element is inactive and the heating moderate, the gases are condensed on the surface of the carbon, whereby further reactions are prevented or delayed.

If the carbon is put in conductive connection with an electrode having the property of absorbing the oxygen of the air, the following reactions are supposed to take place:

2. $CO + O = CO_2$.
3. $H_2 + SO_2 + O = H_2O + SO_2 = H_2SO_3$.
4. $H_2SO_3 + O = H_2SO_4$.

While the gases condensed on the surface of the carbon become oxidized in this way, the final result being carbonic acid escaping from the battery, new gases are continually produced and a continuous working gas element is thus created in which the electrolyte remains unchanged.

The present invention relates to a galvanic cell, consisting of an anode of amorphous carbon, in combination with a suitable air depolarizer, in an electrolyte consisting of concentrated sulfuric acid, preferably heated, with or without addition of other electrolytes.

The oxygen of the atmospheric air may be introduced into the cathode in such a way that the latter is surrounded by a depolarizing electrolyte, (which after giving up oxygen has the property of again taking up the same from the atmospheric air,) or by making the cathode itself porous and oxygen absorbing. In both cases it is convenient to facilitate the supply of the oxygen of the air to the electrolyte or to the cathode by mechanical means. The above mentioned arrangements may suitably be used in combination with each other.

As heated, concentrated sulfuric acid in the presence of oxygen exerts a highly oxidizing effect, it is in this element a matter of utmost importance that the cathode be made of a substance completely indifferent in the said electrolyte. I have found that, besides the precious metals, only certain species of graphite i. e. those which are most stable against oxidation, are suitable for this purpose.

The preparation of cathodes of a suitable form from pulverized graphite may be done in the following manner:—The graphite is moistened with a dilute solution of water-glass, after which the mass is pressed under a considerable pressure, into molds of desired form. The brick thus formed is then removed from the mold and immersed in a solution of a salt of magnesium or other suitable metal, whereby magnesium or other silicates, insoluble in the sulfuric acid, are formed, said silicates having the property of binding together the particles of graphite. The alkaline salt is removed by immersing the electrode in water. Bricks of graphite can also be manufactured by mixing the latter with glass powder and heating the mixture to the melting temperature of the glass.

Electrodes produced in the manner described offer in the present case the same advantages as those of precious metals and can also be made porous, and are, consequently, to a certain degree oxygen-absorbing.

The electrodes are preferably made in the form of closely perforated tubes $a$, as illustrated in the annexed drawing, forming part of this specification, and in which—

Figure 2:
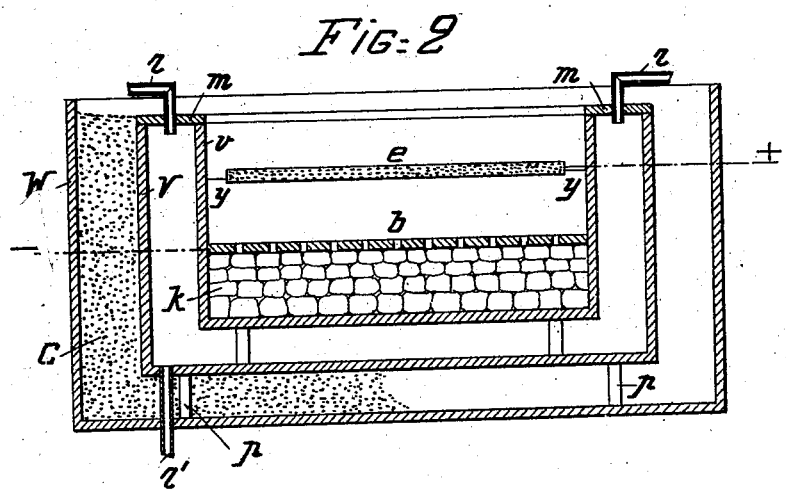

Figure 1 represents an electrode in vertical cross-section. Fig. 2 represents a cell in vertical section, and Fig. 3 shows in section two complete cells coupled together.

The tubes $a$ are closed at the lower end and provided with plugs $p$ at the upper end. Air is forced in at the end at $l$ through pipe $g$ that passes through the plug $p$ and escapes through the openings $h$ in the sides of the electrode into electrolyte, traversing same, and then escapes through a suitable outlet, opportunity being thereby given to the electrolyte as well as to the porous electrode to absorb oxygen, and moreover, the active surface of the depolarizer is always in contact with the oxygen.

The carbon used at the anode consists of conducting carbon, such as coke or gas-coal. Non-conducting carbon, such as hard coal, can be made electrolytically active by pulverizing and mixing the same with finely divided graphite that is oxidizable with difficulty, and then forming bricks of the mixture in the manner described above, or in any other manner. The amorphous carbon then reacts with the sulfuric acid and becomes oxidized thereby, while the graphite remains unchanged and may be used repeatedly.

As admixtures to the electrolyte, at the same time facilitating the depolarization and absorbing and delivering oxygen, I use either nitrogenous gases, such as $$NO, N_2O_3, NO_2,$$

or chlorin combinations of such gases, said substances, as is known, combining chemically with concentrated sulfuric acid. Also sulfates of such metal radicals as are capable of forming more than one sulfid, such as sulfate of manganese, chromium, iron, copper, mercury and the like may be used. The nitrogenous gases may be directly supplied by introducing the same in the acid. The salts are suitably obtained by dissolving the corresponding metal or metal oxid in the acid. A mixture of nitrogenous gases with such salts is especially suitable. If such intermediary substances are used the following reactions, by way of example, take place in connection with formula 1:

$$H_2 + H_2SO_4 + NO_2 = H_2O + H_2SO_4 + NO$$

and further by air oxidation:

$$NO + O = NO_2$$

and as an example:

$$CO + 2MSO_4 + H_2O = CO_2 + M_2SO_4 + H_2SO_4$$

and furthermore by air oxidation:

$$M_2SO_4 + H_2SO_4 + O = 2MSO_4 + H_2O$$

in which latter formulæ M designates a metallic radical, the valence of which varies between 1 and 2. Such reactions also take place simultaneously and in combination with each other.

In the most simple form a cell of the type indicated may be constructed as follows: On the bottom of a vessel of lead, or of wood lined with lead, or of earthenware, or of any other suitable material, pieces of coke $k$ are placed, and over them a perforated disk $b$ of lead or any other suitable material coated with graphite is fitted in. The purpose of this disk is by means of its weight to keep the pieces of coke in conducting contact with each other, but the disk also forms the inactive conductor for the anode thus formed. The cathode consists of a porous brick $e$ of scale or flake graphite that is oxidizable with difficulty. The vessel is filled up with concentrated sulfuric acid to a height slightly exceeding the lower surface of the brick $e$, the level being marked on the drawing by the lines $y$—$y$. Then the vessel is placed in another, larger vessel $v$ of suitable material, resting upon the supports $p$. The space between the two vessels is closed by a cover $m$ through which pipes $r$ are run, for the admission and discharge of the steam, so that the electrolyte may be heated above 30° C. $r'$ is a discharge pipe for the water of condensation. The whole complex is then put into a still larger vessel $w$ and the space between the walls is filled with a heat insulating material $c$, such as saw-dust or the like.

Fig. 3 shows an improvement, for acquiring a more efficacious and rapid depolarization of the cathode. The electrodes are here separated by a porous partition $n$ of a material which is not affected by the electrolyte, such as asbestos. With this arrangement, however, the same inconvenience arises as in other galvanic elements and electrolytic apparatus that are provided with porous partition walls, namely that a diffusion occurs between the different fluid compartments separated by the porous partition. Owing to this diffusion a depolarizing electrolyte would in the present case penetrate the porous partition and give rise to local reactions at the anode, the consequence being that the working tension would be essentially decreased. In order to obviate the detrimental effect of said diffusion, the porous partition is made of conducting material indifferent in heated concentrated sulfuric acid, such as graphite, said partition being moreover put in conducting connection with the cathode. The liquid, diffusing through the pores of said partition, by this arrangement acts as a depolarizer, thereby delivering oxygen, and consequently thereafter being incapable of giving rise to local reactions at the anode. This arrangement has proven especially practical when using nitrogenous gases or nitric acid in the electrolyte, as said gases or said acid are all reduced by passing through the pores of the carbon partition to gaseous NO, said gaseous product rising to the surface of the electrode, where it is again oxidized by the air and combined with the concentrated sulfuric acid.

The cathode consists of closely perforated tubes $a$ of bricked graphite, see Fig. 1. A rod $h$, also of graphite and provided with projections $u$ of the same material, (said rods being, as shown on the drawing, exactly fitted in the tubes $a$) serves as a conductor common to all of said tubes $a$. Small pipes $s$ of glass or other material, are fitted in through the stoppers $u$ and the rod $h$. Said pipes open into a tube $r$, through which air is forced into the electrolyte; the air escapes through the tube $r'$. To the sulfuric acid floating above the porous partition $m$ a substance is added, having the property of taking up and delivering oxygen, such as nitrogenous gases, salts of metal radicals with varying valences, or other materials having the same property. In Fig. 3 two elements of this kind are shown coupled together. The coupling devices, especially the ones adapted for the admission of air, water and steam, may be arranged in parallel if so desired.

In order to introduce the air in a dry state, the same is previously conducted through a vessel $w$ filled up with sulfuric acid or other water-absorbing material. The escaping air, after leaving the cells and commingled with vapors of sulfuric acid or nitrogenous gases, is conducted through the vessel $z$ filled with refrigerated concentrated sulfuric acid.

The working tension at each element at normal charge will, in round numbers, be half a volt. The theoretical tension of the combination carbon-oxygen being about one volt, about 50% of the energy of the combustion of carbon is thus utilized, i. e., about ten times as much as in a modern steam engine.

It may be observed, that the consumption of the carbon, contrary to what is the case in steam engines, automatically conforms to the quantity of the electric current taken from the battery, and the wasting or useless consumption of combustible material is completely obviated.

I claim—

1. In a primary galvanic element, an anode of amorphous carbon, an electrolyte of concentrated sulfuric acid and a cathode insoluble in the electrolyte and a depolarizer of atmospheric air.

2. In a primary galvanic element, an anode of amorphous carbon, an electrolyte containing sulfuric acid in concentrated form, a cathode and means to supply air to the cathode.

3. In a primary galvanic element, a suitable electrolyte, a carbon anode capable of being oxidized by the electrolyte, and a graphite cathode insoluble in the electrolyte.

4. In a primary galvanic element, a suitable electrolyte, a carbon anode capable of being oxidized by the electrolyte, a graphite cathode substantially insoluble in the electrolyte, and means to supply air to the cathode to depolarize the same.

5. In a primary galvanic element, an electrolyte of concentrated sulfuric acid, an anode of amorphous carbon, a cathode of graphite that is oxidizable with difficulty and means to supply air to the cathode.

6. In a primary galvanic element, an electrolyte of concentrated sulfuric acid containing a compound capable of giving off oxygen and re-combining with oxygen again, a cathode insoluble in the electrolyte, means to maintain the electrolyte at a temperature above normal and a carbon anode.

7. In a primary galvanic element, an electrolyte of sulfuric acid containing a compound capable of giving up and recombining with oxygen again, an anode of carbon, a cathode of carbon, means to supply air to the cathode, and means to maintain the electrolyte heated above normal temperature.

8. In a primary galvanic element, an electrolyte of sulfuric acid, an anode of amorphous carbon, conducting means insoluble in the electrolyte to maintain the carbon particles in conductive contact with one another, a cathode of graphite that is oxidizable with difficulty and a porous partition insoluble in the electrolyte separating the anode and cathode.

9. In a primary galvanic element, an electrolyte of sulfuric acid containing a compound capable of giving up and re-combining with oxygen, an anode of amorphous carbon, a conductive weight insoluble in the electrolyte to maintain the carbon particles in contact, a cathode of graphite that is oxidizable with difficulty, a porous partition separating the anode and cathode, means to heat the electrolyte above normal, and means to supply air to the cathode.

In testimony, that I claim the foregoing as my invention, I have signed my name in presence of two subscribing witnesses.

ERNST WALDEMAR JUNGNER.

Witnesses:
T. BORJE,
ASE W. NORDSTROM.